US007756631B2

(12) United States Patent
Chavira et al.

(10) Patent No.: US 7,756,631 B2
(45) Date of Patent: Jul. 13, 2010

(54) METHOD FOR REALTIME SCALING OF THE VEHICLE ROUTING PROBLEM

(75) Inventors: Marcos D. Chavira, Playa Del Rey, CA (US); Hamid Karimi, Fullerton, CA (US); Carolyn B. Boettcher, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 968 days.

(21) Appl. No.: 11/513,875

(22) Filed: Aug. 31, 2006

(65) Prior Publication Data

US 2008/0059056 A1 Mar. 6, 2008

(51) Int. Cl.
*G05D 1/00* (2006.01)
(52) U.S. Cl. ..................... 701/202; 73/178 R
(58) Field of Classification Search ......... 701/200–202, 701/208–211; 340/988; 73/178 R
See application file for complete search history.

(56) References Cited

U.S. PATENT DOCUMENTS

| 5,684,704 | A  | * | 11/1997 | Okazaki ..................... 701/208 |
| 6,244,536 | B1 | * | 6/2001  | Cloutier ..................... 244/3.19 |
| 7,185,844 | B2 | * | 3/2007  | Yanushevsky .............. 244/3.15 |

OTHER PUBLICATIONS

Cook et al., "Fractional Bandwidth Reacquisition Algorithms for VSW-MCM, Multi-robot Systems: From Swarms to Intelligent Automata, vol. II," Kluwer Academic Publishers, Dordrecht, A.C. Shultz et al., p. 77-86 (2003).

Cormen et al., "Introduction to Algorithms," Chapter 35, 2d ed., The MIT Press (Cambridge, MA) pp. 1022-1054 (1990).
Chen, "Scheduling Multiple Families of Jobs on Parallel Machines to Minimize Total Weighted Completion Time," Technical Report, University of Pennsylvania, Department of Systems Engineering (Philadelphia, PA), pp. 1-20 (Sep. 2000).
Norvig et al., "Artifical Intelligence A Modern Approach," Chapter 4, 2d ed., Pearson Education, Inc. (Upper Saddle River, NJ), pp. 110-122 (2003).
Zhang, "Depth First Branch and Bound Versus Local Search: A Case Study Proceedings of the 17th National Conference on Artificial Intelligence," pp. 260-266, (2000).
Zhu et al., "Heuristic Methods for Vehicle Routing Problem with Time Windows," Technical Report, National University of Singapore, pp. 1-7 (Sep. 1999).

* cited by examiner

*Primary Examiner*—Dalena Tran
(74) *Attorney, Agent, or Firm*—Pillsbury Winthrop Shaw Pittman LLP

(57) ABSTRACT

An absolutely optimal routing or a quasi-optimal routing is computed for a first plurality of resources m to be routed to a second plurality of resource destinations n, depending on a count of m and n. Three different algorithms are used. For the case where the count is $m \leq 6$ and $n \leq 8$, a first algorithm is used to arrive at an absolutely optimal routing. An example of the first algorithm is Depth First Branch and Bound Search. For a second count, where the value of the count is more numerous than the first count, m is greater than six, but equal to, or less than or equal to fifty, $6 < m \leq 50$, and n is greater than 8, but less than or equal to one hundred, $8 < n \leq 100$, a second algorithm, is used to compute a quasi-optimal routing. An example of this second algorithm is Local Search. For a third count, where the count exceeds those above, a third algorithm is used for computing a quasi-optimal routing. Typically this third algorithm applies where $m > 50$, and $n > 100$. An example of this third algorithm is Swarming.

14 Claims, 4 Drawing Sheets

FIG 1 - PRIOR ART

LEGEND

▷ RESOURCES 1.2..m

○ RESOURCE DESTINATIONS 1.2...n

METHOD FOR REALTIME SCALING OF THE VEHICLE ROUTING PROBLEM

BACKGROUND OF THE INVENTION

1. Field of Invention

This invention is in the field of multiple resource allocation/routing to a plurality of resource destinations or tasks.

2. Description of the Related Art

Modern weapons are used in a battlefield where a plurality of targets can be engaged or tracked by multiple resources, e.g. weapons and sensors. In such a scenario, a routing problem arises: which resource to assign to a particular resource destination (task) such as target interception, tracking, and/or surveillance, and in what order. Resources are typically spatially distributed, may change position with time. Resource destinations may be stationary or moving. In view of the distributed, time changing nature of resources and resource destinations, and as their numbers increase, the allocation problem becomes complex. When allocating multiple resources (weapons, sensors, personnel) to engage multiple resource destinations (e.g. targets) it is desired to optimize allocation as a function many variables, such as time, distance from target(s), munitions capability, and/or target priority.

This allocation procedure is similar to the well known vehicle routing problem where many customers are to be visited, each at various locations separated by distances, typically in an irregular geometric pattern. Vehicle routing (resource allocation) among many customers (resource destination) may be optimized, for example, by minimizing the cost of each visit, i.e. total miles traveled. Another optimizing approach could be to visit those customers having higher priority first, or the closest ones, or the one's most likely to place a large order. From this simple illustration, it is apparent that the complexity of the solution to resource allocation increases as the number of resources (vehicles) and resource destinations (customers) increases.

Yet another dimension of complexity is added if each of a plurality of resources can be routed to any of a large number of resource destinations in real time. To illustrate the complexity of the problem, consider the scenario of an airline having hundreds of airplanes (resources) and dozens of airports to service (resource destinations). It is desired to optimize allocation of airplanes to travel certain routes, servicing the airports, subject to the constraints of passenger loading, profit maximization, fuel cost/maximum aircraft range and efficiency, perhaps weather avoidance. The plane allocation has to be computed in real time as weather patterns change, planes may be out of service, unavailable pilots/crew re-allocated. The solution to such a complex problem is computationally intensive, possibly precluded from arriving at an analytical result. Consequently, analytical results may become available too late to be practical.

The prior art approached a solution to this type of allocation problem by brute force. That is, each possible route and resource to resource destination routing possibility is computed to arrive at an absolutely optimal routing. The route best meeting the desired optimizing criterion is chosen after considering all route combinations. This approach presents an arduous computing task, impractical for a timely solution in a fast changing scenario where multiple resources (vehicles) can be allocated to many routes and respective resource destinations.

SUMMARY OF THE INVENTION

Above limitations are avoided by a method for computing an absolutely optimal routing or a quasi-optimal routing for a first plurality of resources m to be routed to a second plurality of resource destinations n, depending on a count of m and n, subject to an optimizing constraint. The method comprises the use of three algorithms. For the case where the count is $m \leq 6$ and $n \leq 8$, a first algorithm is used to arrive at an absolutely optimal routing. An example of the first algorithm is Depth First Branch and Bound Search.

For a second count, where the value of the count is more numerous than the first count, i.e. m is greater than six, but equal to, or less than or equal to fifty, $6 < m \leq 50$, and n is greater than 8, but less than or equal to one hundred, $8 < n \leq 100$, a second algorithm, is used to compute a quasi-optimal routing. An example of this second algorithm is Local Search.

For a third count, where the count exceeds those above, a third algorithm is used for computing a quasi-optimal routing. This third count at least twice as numerous as the first count. Typically this algorithm applies where $m > 50$, and $n > 100$. An example of this third algorithm is Swarming.

DETAILED DESCRIPTION OF THE INVENTION

Figure 1:
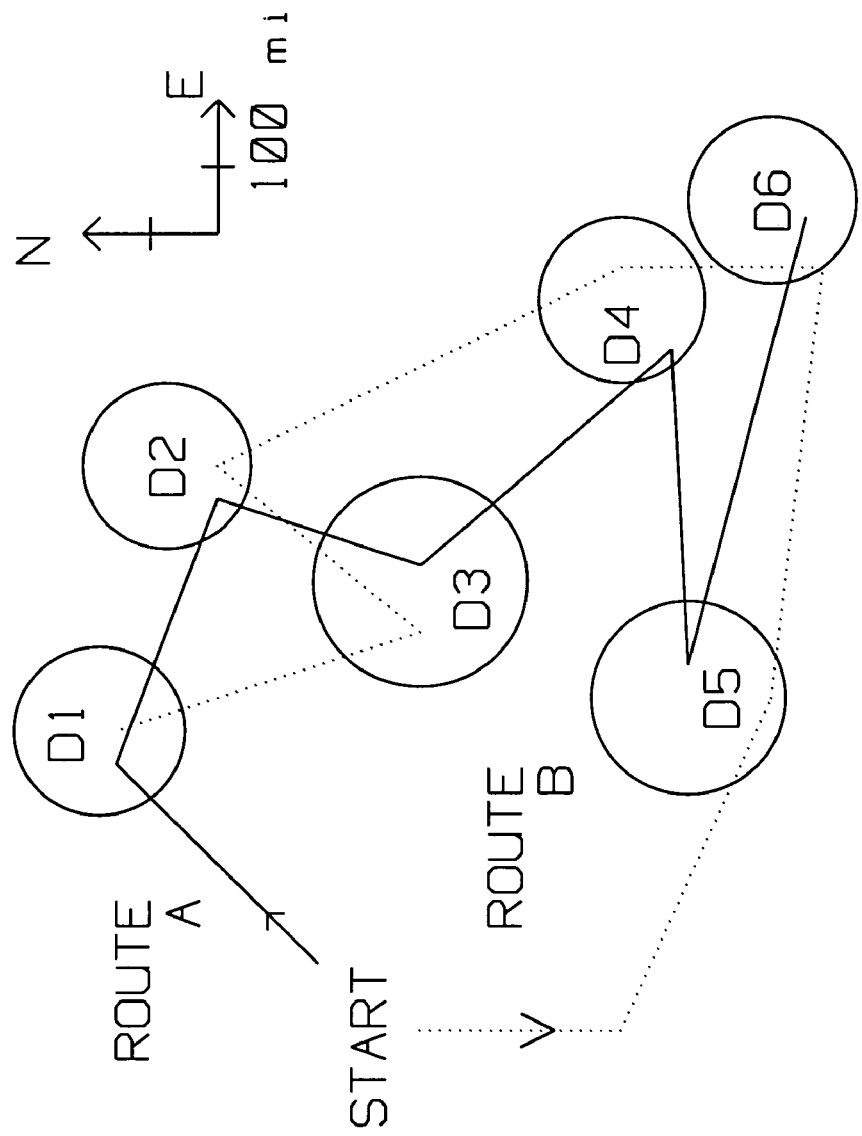
FIG. 1 is an illustration of an example of two possible routes taken by a single vehicle to a plurality of destinations descriptive of the routing problem solved by the prior art.

FIG. 1 is an illustration of two possible routes taken by a resource (single vehicle) to a plurality of resource destinations descriptive of the routing problem solved by the prior art. Route A routes the resource from START to resource allocations (destinations) D1, D2, D3 D4 D5 and D6 in sequence. In contrast, Route B routes the resource to the same 6 resource allocation (destinations), but in a different order then Route A. Route B goes to destination D5 first, followed by D6, then D4, D2, next to D3, finally to D1. Route A may be optimal given one set of constraints, while Route B is optimal given a second, different set of constraints. For example, if it is critical that resource allocation D1 be serviced first, having a high priority, then Route A is most likely optimal, compared to Route B. Conversely, if resource allocation D5 has highest priority, it is likely Route B would be optimal, as compared to Route A. The computation of the routing problem has an absolute optimal solution depending on optimizing constraints. Typically such an absolute optimal solution cannot be computed in bounded time if more than a dozen or so resources and resource allocation are involved, as discussed below.

Figure 2:
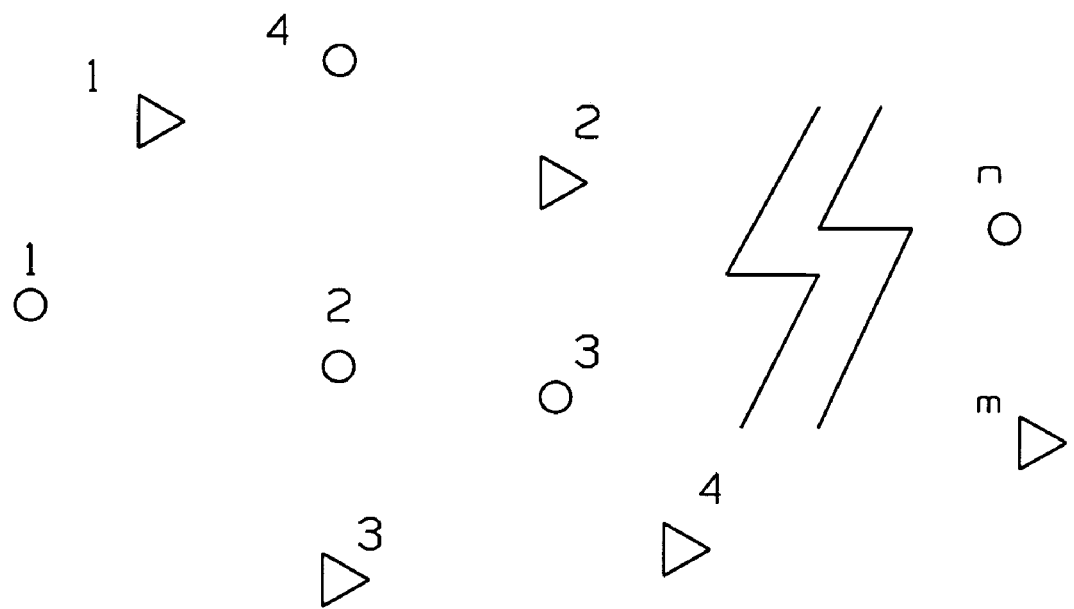
FIG. 2 is an illustration of a first plurality of resources (e.g. vehicles) m, routed to a plurality of resource destinations n.

FIG. 2 details a general resource allocation problem of m resources to n resource destinations in view of optimization constraints. Resources 1,2 . . . m, are located randomly on coordinates of the map, shown as triangles. Resource destinations (tasks) 1,2, . . . n, also randomly located, can be serviced by any of the resources 1,2, . . . m. Assume n>m. Thus, the resource allocation problem to be solved is in what order resources 1,2 . . . m are to be routed to service the 1, 2 . . . n resource destinations.

The problem has been studied in academia in a variety of forms. One form of the problem is that of the traveling salesman (a resource) servicing a plurality of customers (resource destinations) as detailed by Thomas H. Cormen, Charles E.

Leiserson, Ronald L. Rivest, Clifford Stein in it *Introduction to Algorithms*, chapter 35, pages 1022-1054 The MIT Press, Cambridge, Mass., second edition 1990, incorporated herein in its entirely by reference.

Another form of the problem is exemplified by vehicle routing. Here, a vehicle (a resource) travels to various destinations during its route, as shown in FIG. 1 of this disclosure. The problem to be solved for multiple vehicles and destinations is detailed by K. Q. Zhu, K. C. Tan and L. H. Lee in *Heuristic Methods for Vehicle Routing Problem with Time Windows*, Technical Report, National University of Singapore, September 1999, incorporated herein in its entirely by reference.

Yet another form of the problem is exemplified by job scheduling on multiple, possibly parallel computer processors. This version revolves around the allocation of processor time (a resource) to particular computing tasks (a resource destination). This type of allocation problem is detailed by Zhi-Long Chen in *Scheduling Multiple Families of Jobs on Parallel Machines to Minimize Total Weighted Completion Time*, Technical Report, University of Pennsylvania, Department of Systems Engineering, Philadelphia, Pa., September 2000.

The limitation of the solutions presented by the above authors is that the computations involved may preclude real time results. Should the computation of an absolutely optimal solution be constrained to operate in real time, it is not clear that the results obtained are optimal, or that one approach is superior to another, given certain constraints.

Theoretical computer science has found that the optimal solution for this type of problem is relatively complex. It can be shown that the number of possible solutions to the m resources servicing n possible resource destinations is given by $$\frac{(m+n-1)!}{(m-1)!} \qquad 1$$

For example, in accordance with equation 1, for n=120 possible resource allocations and m=50 resources, there are $10^{36}$ more possible solutions to be searched as compared to the case were there are only m=5 resources. To determine if a particular solution is absolutely optimal, all possible solutions have to be tested against a particular criterion. When the number of computations is in the order of $10^{36}$, it becomes clear that today's processors with postulated speeds of $10^{12}$ computations per second would still take far too long ($10^{24}$ seconds) to arrive at a useful real time result.

The method described herein finds a solution to above problem for medium and large counts for m and n by judiciously making a tradeoff between finding the one absolutely optimal solution and a quasi-optimal solution. The quasi-optimal solution is typically very close to the absolutely optimal solution in practical terms. Thus benefits of real time solutions can be had by avoiding the search for the one absolutely optimal solution. Instead, the quasi optimal solution provides most of the benefits of the absolutely optimal solution while reducing the computing burden precluding real time results.

While the absolutely optimal solution is strived for, an approximate, quasi optimal solution is computed for the more complex cases. Avoiding the requirement of computing an absolutely best solution saves computation time with minimal loss of practical optimization. Quasi optimal solutions generated by this method are typically very close to the absolute optimum results, thus represent a computationally efficient way of reaching a practical, almost perfect result.

The quasi-optimal solution for medium to large counts of m and n is arrived by combining three previously documented algorithms from diverse arts. The benefits of the three different algorithms are combined using the teachings herein for an optimization criterion to generate a real time, quasi optimal result.

The first of the three algorithms used is derived from operations research, Depth First Branch and Bound Search, is detailed by W. Zhang in *Depth First Branch and Bound Versus Local Search: A Case Study* Proceedings of the 17th National Conference on Artificial Intelligence, pages 260-266, Austin, Tex., 2000 AAAI, incorporated herein in its entirety by reference. In this disclosure, this first algorithm is used for smaller size problems, typically for six or fewer resources (m≦6) and eight or fewer resource destinations (n≦8).

The second algorithm of the three, from the art of Artificial Intelligence, called Local Search, is detailed by Peter Norvig, Stuart J. Russell in *Artificial Intelligence A Modern Approach*, Chapter 4, pages 110-122, Pearson Education, Inc., Upper Saddle River, N.J. 07458, Second Edition, 2003, 1995, incorporated herein in its entirety by reference. In this disclosure, this algorithm is used for medium size problems where there are more than 6 resources (m>6) and more than eight resource destinations (n>8) up to 50 resources (m≦50) and 100 resource destinations (n≦100).

The third algorithm of the three, from the art of Mathematics, called Swarming, is detailed by Benjamin Cook, D. Marthaler, C. Topaz, A. Bertozzi and M. Kemp, in *Fractional Bandwidth Reacquisition Algorithms for VSW-MCM*, Multi-robot Systems: From Swarms to Intelligent Automata, Volume II, 2003, Kluwer Academic Publishers, Dordrecht, A. C. Schultz et al, editors, 77-86, incorporated herein in its entirety by reference. In this disclosure, this algorithm is used for larger size problems where there are more than 50 resources (m>50) servicing more than 100 resource destinations (n>100).

Figure 3:
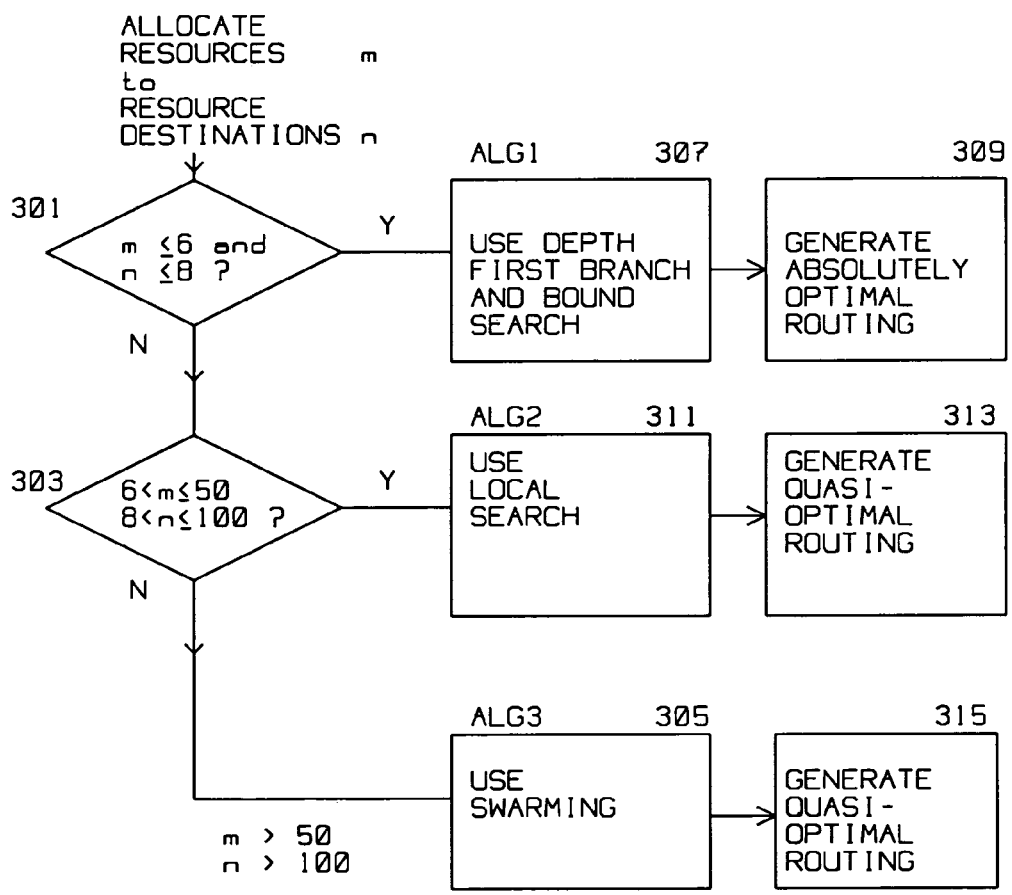
FIG. 3 is a flow diagram of the method disclosed herein.

The teachings of this disclosure are further detailed and summarized in FIG. 3. Here, a method is shown for computing an absolutely optimal routing or a quasi-optimal routing for a first plurality of resources m to be routed to a second plurality of resource destinations n, depending on a count of said first plurality of resources m and said second plurality of resource destinations (tasks) n, subject to an optimizing constraint. The method comprises the use of three algorithms. For the case where the count m≦6 and n≦8, decision box 301 directs arriving at a solution using algorithm ALG1 307, for example Depth First Branch and Bound Search. For this relatively low count for m and n, Generate Absolutely Optimal Routing 309 provides an absolutely optimal routing solution.

The decision tree continues with decision box 303. Decision box 303 directs for this medium case the use of a second algorithm ALG2 311 for computing quasi-optimal routing for a second count of said first plurality of resources m and said second plurality of resource destinations n. This second count is typically more numerous than the first count. For example, in a best mode implementation, the second count of the first plurality of resources is greater than six, but equal to, or less than or equal to fifty, 6<m≦50, and the second plurality of resource destinations is greater than 8, but less than or equal to one hundred, 8<n≦100. An example of a second algorithm is Local Search.

For counts exceeding those above, a third algorithm, ALG3 305 is used for computing quasi-optimal routing for the first plurality of resources m and second plurality of resource destinations n. This third count is more numerous than the second count and, generally, at least twice as numerous as the first count. Typically this algorithm applies where the first plurality of resources is greater, for example, than fifty, m>50, and the second plurality of resource destinations is greater than 100, n>100. Generate Quasi-Optimal Routing 315 provides routing details to resources and resource destinations as computed by ALG 3 305. An example of an algorithm applicable to ALG3 is Swarming.

Figure 4:
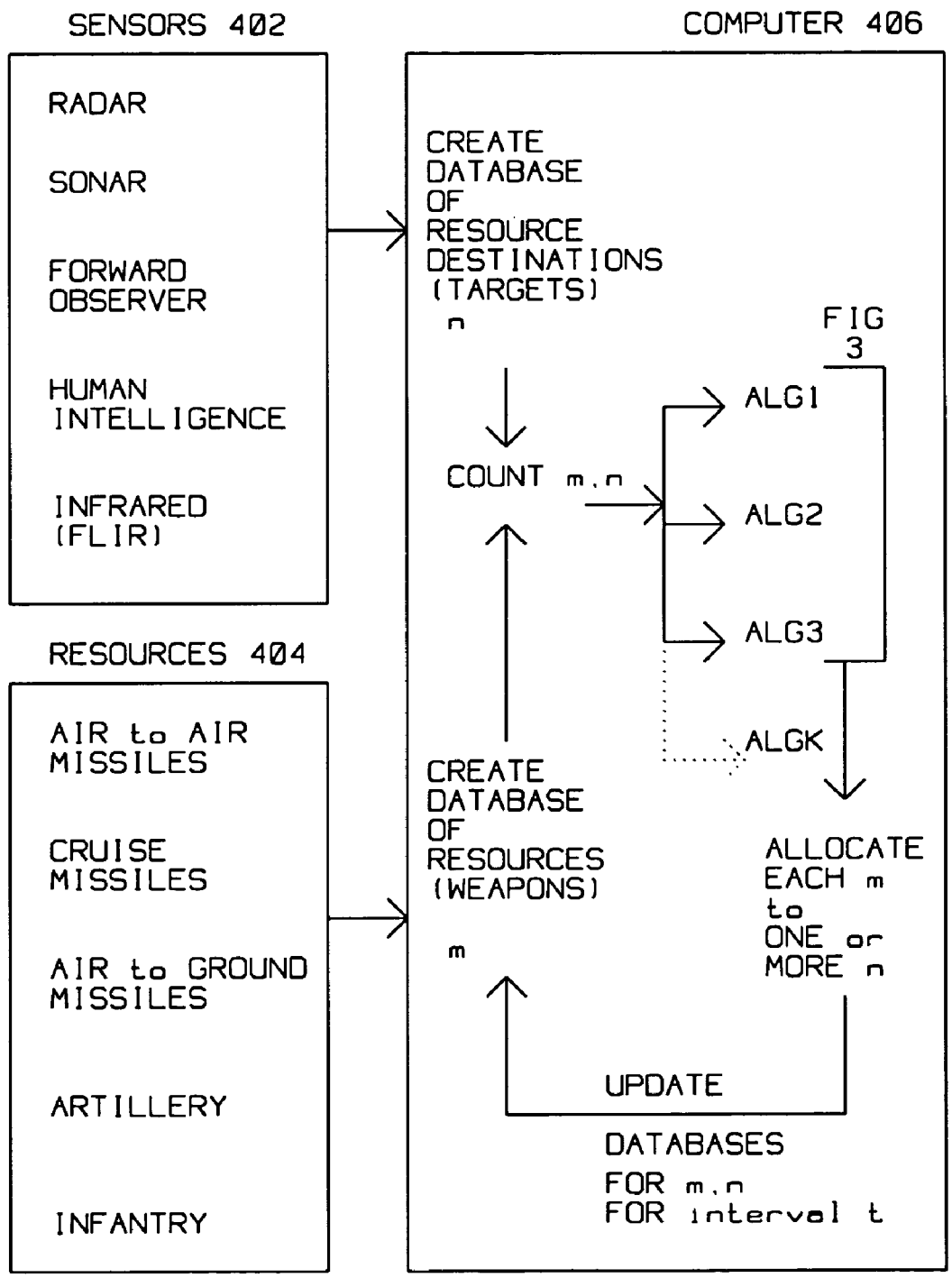
FIG. 4 is a block diagram of a system using the method described in FIG. 3.

FIG. 4 shows a typical system envisioned using the method detailed in FIG. 3 in a battle type environment at a particular geo-location. A group of sensors 402 such as, for example, RADAR, SONAR, forward observers, human intelligence, and/or infrared (FLIR) generate a list of targets to be considered detailing locations within the geo-location of interest. Concurrently, Resources 404 is a list of available weapons available within the geo-location of interest, such as, for example, air to air missiles, cruise missiles, air to ground missiles, artillery, and/or infantry.

Computer 406 creates a database of resource destinations n from the data supplied by sensors 402. Resources 404 supplies the data to computer 406 to create a database of resources m applicable to the geo-location of interest. Computer 406 counts m and n, and based on the count uses either ALG1 (algorithm 1), ALG2 (algorithm 2) or ALG 3 (algorithm 3) in accordance with FIG. 3 to allocate (or route) each of m resources to one or more resource destinations. FIG. 3 can be extended to more than three algorithms, such as algorithm k. This process is cyclic in that both the resource destination data base and the resource database are updated at time intervals t. For t to be practical, computations updating the databases and allocations are in real time, in the order of every 10 seconds.

All references cited in this document are incorporated herein in their entirety by reference.

Although presented in exemplary fashion employing specific embodiments, the disclosed structures are not intended to be so limited. For example, although specific algorithms are recited, others are equally applicable having similar results. Thus, their application is envisioned herein. The break points of m and n were chosen as best mode implementations for this disclosure given currently available computing power and the exemplary algorithms. These may shift in time with changes in technology. While only three algorithms are shown, it is clear that more than 3, up to k algorithms can be applied to better meet specific requirements.

Those skilled in the art will also appreciate that numerous changes and modifications could be made to the embodiment described herein without departing in any way from the invention.

We claim:

1. A method for computing an absolutely optimal routing or a quasi-optimal routing for a first plurality of resources m, m>1, to be routed to a second plurality of resource destinations n, n>1, depending on a count of said first plurality of resources m and said second plurality of resource destinations n, the method comprising:

using a first algorithm for computing said absolutely optimal routing for a first count of said first plurality of resources m>1 and said second plurality of resource destinations n>1;

using a second algorithm for computing said quasi-optimal routing for a second count of said first plurality of resources m and said second plurality of resource destinations n, where said second count is more numerous than said first count; and using a third algorithm for computing said quasi-optimal routing for a third count of said first plurality of resources m and said second plurality of resource destinations n, where said third count is more numerous than said second count and at least twice as numerous as said first count.

2. A method for computing an absolutely optimal routing or a quasi-optimal routing for a first plurality of resources m to be routed to a second plurality of resource destinations n depending on a count of said first plurality of resources m and said second plurality of resource destinations n, the method comprising:

using a first algorithm for computing said absolutely optimal routing for a first count of said first plurality of resources m and said second plurality of resource destinations n;

using a second algorithm for computing said quasi-optimal routing for a second count of said first plurality of resources m and said second plurality of resource destinations n, where said second count is more numerous than said first count; and using a third algorithm for computing said quasi-optimal routing for a third count of said first plurality of resources m and said second plurality of resource destinations n, where said third count is more numerous than said second count and at least twice as numerous as said first count, wherein said first algorithm is used where said first count of said first plurality of resources is less than or equal to six, $m \leq 6$, and said second plurality of resource destinations is less than or equal to eight, $n \leq 8$.

3. The method of claim 2, wherein said second algorithm is used where said second count of said first plurality of resources is greater than six, but equal to, or less than or equal to fifty, $6 < m \leq 50$, and said second plurality of resource destinations is greater than 8, but less than or equal to one hundred, $8 < n \leq 100$.

4. The method of claim 2, wherein said third algorithm is used where said third count of said first plurality of resources is greater than fifty, m>50, and said second plurality of resource destinations is greater than 100, n>100.

5. The method of claim 2, wherein said first algorithm is a Depth First Branch and Bound Search algorithm.

6. The method of claim 2, wherein said second algorithm is a Local Search algorithm.

7. The method of claim 2, wherein said third algorithm is a Swarming algorithm.

8. A system for an absolutely optimal routing or a quasi-optimal routing of a first plurality of resources m, m>1, to a second plurality of resource destinations n, n>1, depending on a count of said first plurality of resources m and said second plurality of resource destinations n, the system comprising:

one or more sensors for identifying said second plurality resource destinations n>1;

said first plurality of resources m>1;

a computer for using a first algorithm for computing said absolutely optimal routing for a first count of said first plurality of resources m and said second plurality of resource destinations n;

using a second algorithm for computing said quasi-optimal routing for a second count of said first plurality of resources m and said second plurality of resource destinations n, where said second count is more numerous than said first count; and using a third algorithm for computing said quasi-optimal routing for a third count of said first plurality of resources m and said second plurality of resource destinations n, where said third count is more numerous than said second count and at least twice as numerous as said first count.

9. A system for an absolutely optimal routing or a quasi-optimal routing of a first plurality of resources m to a second plurality of resource destinations n depending on a count of said first plurality of resources m and said second plurality of resource destinations n, the system comprising:
   one or more sensors for identifying said second plurality resource destinations n;
   said first plurality of resources m;
   a computer for using a first algorithm for computing said absolutely optimal routing for a first count of said first plurality of resources m and said second plurality of resource destinations n;
   using a second algorithm for computing said quasi-optimal routing for a second count of said first plurality of resources m and said second plurality of resource destinations n, where said second count is more numerous than said first count; and
   using a third algorithm for computing said quasi-optimal routing for a third count of said first plurality of resources m and said second plurality of resource destinations n, where said third count is more numerous than said second count and at least twice as numerous as said first count,
   wherein said first algorithm is used where said first count of said first plurality of resources is less than or equal to six, $m \leq 6$, and said second plurality of resource destinations is less than or equal to eight, $n \leq 8$.

10. The system of claim 9, wherein said second algorithm is used where said second count of said first plurality of resources is greater than six, but equal to, or less than or equal to fifty, $6 < m \leq 50$, and said second plurality of resource destinations is greater than 8, but less than or equal to one hundred, $8 < n \leq 100$.

11. The system of claim 9, wherein said third algorithm is used where said third count of said first plurality of resources is greater than fifty, $m > 50$, and said second plurality of resource destinations is greater than 100, $n > 100$.

12. The system of claim 9, wherein said first algorithm is a Depth First Branch and Bound Search algorithm.

13. The system of claim 9, wherein said second algorithm is a Local Search algorithm.

14. The system of claim 9, wherein said third algorithm is a Swarming algorithm.

* * * * *